United States Patent [19]

Warshawsky

[11] Patent Number: 4,842,231
[45] Date of Patent: Jun. 27, 1989

[54] ADJUSTABLE FRICTION MOUNTING FOR LAMPS

[76] Inventor: Jerome Warshawsky, 3284 Bertha Dr., Baldwin Harbor, N.Y. 11510

[21] Appl. No.: 144,661

[22] Filed: Jan. 12, 1988

Related U.S. Application Data

[63] Continuation of Ser. No. 930,049, Nov. 12, 1986, abandoned.

[51] Int. Cl.$^4$ .............................................. F16M 13/00
[52] U.S. Cl. ........................... 248/316.2; 248/231.3; 248/295.1
[58] Field of Search ................. 248/295.1, 296, 316.2, 248/231.3

[56] References Cited

U.S. PATENT DOCUMENTS

| | | | |
|---|---|---|---|
| 870,038 | 11/1907 | Knapp | 248/293 |
| 873,446 | 12/1907 | Manheim | 248/293 |
| 1,166,408 | 12/1915 | Blood | 403/366 |
| 1,836,348 | 12/1931 | Wardell | 403/361 |
| 1,970,624 | 8/1934 | Rocker | 248/337 |
| 2,284,955 | 6/1942 | Francis | 248/337 |
| 2,545,419 | 3/1951 | Williams | 248/316.1 |
| 2,652,270 | 9/1953 | Jones | 403/366 |
| 2,696,965 | 12/1954 | Maxwell | 248/316.1 |
| 2,827,316 | 3/1958 | Duffy | 403/366 |
| 2,869,883 | 1/1959 | Dunbar | 403/342 |
| 2,875,805 | 3/1959 | Flora | 248/544 |
| 2,970,798 | 2/1961 | Fortchle | 248/229 |
| 3,185,838 | 5/1965 | Warshowsky | 248/337 |
| 3,338,607 | 8/1967 | Broodhurst | 403/342 |
| 3,345,061 | 10/1967 | Schaefer | 248/125 |
| 3,749,345 | 7/1973 | Luder | 248/125 |
| 3,764,098 | 10/1973 | Dickinson | 248/542 |
| 4,186,905 | 2/1980 | Brady | 248/478 |
| 4,238,818 | 12/1980 | Gindel | 362/413 |

Primary Examiner—Alvin C. Chin-Shue
Attorney, Agent, or Firm—Stephen E. Feldman

[57] ABSTRACT

An adjustable friction mounting for lamps which typically includes an elongated fitting body having a through passage. The passage is cylindrical and has an inwardly-extending terminal circular shoulder at one end, and an outwardly-extending threaded circular recess at the other end, the recess being of greater diameter than the through passage. A flexible resilient inner sleeve or bushing is provided within the passage. The sleeve or bushing is split longitudinally and is disposed coaxially within the through passage. The sleeve or bushing is compressible in service, so that its circumferential dimension may be decreased. An externally threaded ring having an inner face at an angle in the range of 40 to 50 degrees at one end, and relative to its axis, is provided. Thus, when the ring is screwed coaxially into the threaded recess, the face contacts the end of the inner sleeve or bushing and distorts the sleeve or bushing inwards, so that its circumferential dimension is decreased, whereby the sleeve or bushing squeezes against a lamp fixture to provide a frictionally-controlled mounting for the lamp. The elongated fitting body is provided with an external longitudinally-extending flange or the like, to mount the fitting body to a surface such as a wall.

8 Claims, 1 Drawing Sheet

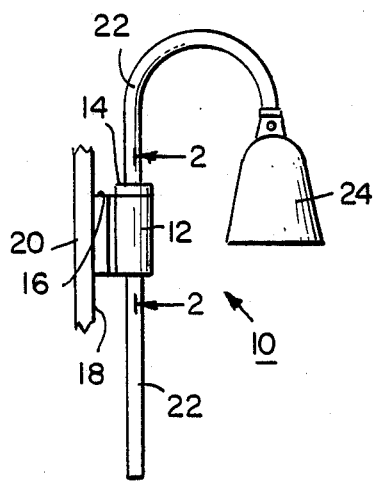
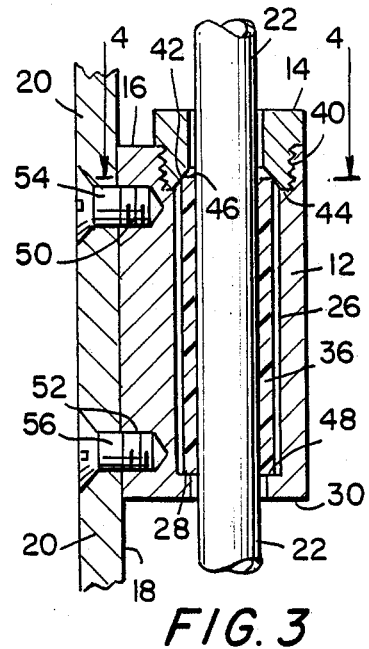
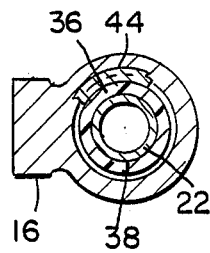
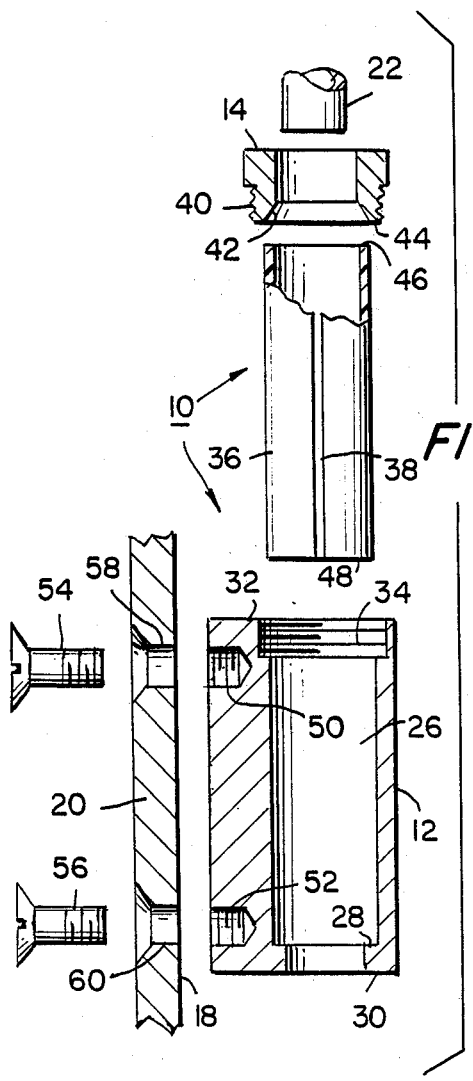
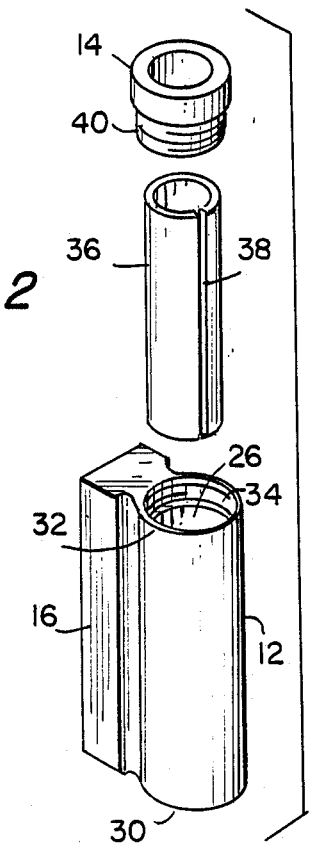
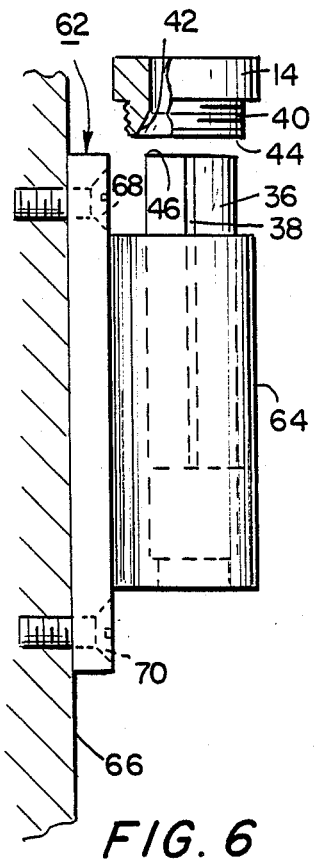

ADJUSTABLE FRICTION MOUNTING FOR LAMPS

This application is a continuation of application Ser. No. 930,049, filed 11/12/86, now abandoned.

BACKGROUND OF THE INVENTION

1. Field of the Invention

An adjustable fitting consisting of an adjustable friction mounting for lamps.

2. Description of the Prior Art

Among the abundance of prior art fittings or other devices for adjustable lamp mountings or the like may be mentioned U.S. Pat. Nos. 1,836,348; 2,610,598; 2,652,270; 2,827,316; 2,970,798; 3,185,838; 3,338,607; 3,345,061; 3,740,085; 3,749,345; and 4,238,818.

These prior art patents relate to diverse devices and apparatus for accomplishing the same desired result in an improved manner, namely, to distort a bushing so that its circumferential dimension is decreased, so that it thus squeezes against a linear or cylindrical member, to provide a frictionally controlled mounting for a lamp or the like.

SUMMARY OF THE INVENTION

1. Purpose of the Invention

It is an object of the present invention to provide an improved adjustable friction mounting for lamps.

Another object is to provide an improved device for adjustable lamp mountings.

A further object is to provide an improved adjustable fitting constituting an adjustable friction mounting for lamps.

An additional object is to provide an adjustable lamp mounting in which an internal, split-ring, cylindrical plastic bushing or sleeve is compressed in service by a threaded ring having a 45° face, which contacts the end of the elongated bushing, so that the split-ring bushing is distorted inwards in service, whereby its circumferential dimension is decreased and thus it squeezes against the lamp pole, riser, or standard, to provide a frictionally-controlled mounting for the lamp.

Still another object is to provide an improved fitting for a lamp fixture.

Still a further object is to provide an improved frictionally-controlled mounting for a lamp.

Still an additional object is to provide an improved sleeve or bushing constituting a clutch means for sliding along and rotating with respect to a cylindrical support member.

Yet another object is to provide an improved adjustable lamp mounting which shall comprise few and simple parts, arranged and constructed in a novel manner, to require a minimum of time and labor for assembly in quantity low cost production.

Yet a further object is to provide an adjustable lamp mounting featuring a sleeve, bushing or clutch which shall be self-lubricating and non-abrasive, to insure against scratching or otherwise marring the polished finish of the cylindrical support, particularly when made of brass.

Yet an additional object is to provide an adjustable support for a lamp fixture which will not bind or freeze the parts together, and yet will permit easy adjustment of the tightness between the movable parts.

An object is to provide an adjustable lamp mounting which is rugged to withstand rough usage, and which is efficient and practical to high degree in use, and which meets the weight support requirements of the light source and associated structure, as well as satisfying individual needs.

These and other objects and advantages of the present invention will become evident from the description which follows:

2. Brief Description of the Invention

The present invention basically entails the provision of an adjustable friction mounting for lamps which typically includes an elongate fitting body having a through passage. The passage is cylindrical and has an inwardly extending terminal circular shoulder at one end, and an outwardly-extending threaded circular recess at the other end, the recess being of greater diameter than the through passage. A flexible resilient inner sleeve or bushing is provided within the passage. The sleeve or bushing is split longitudinally and is disposed coaxially within the through passage. The sleeve or bushing is compressible in service, so that its circumferential dimension may be decreased. An externally threaded ring having an inner face at an angle in the range of 40 to 50 degrees at one end, and relative to its axis, is provided. Thus, when the ring is screwed coaxially into the threaded recess, the face contacts the end of the inner sleeve or bushing and distorts the sleeve or bushing inwards, so that its circumferential dimension is decreased, whereby the sleeve or bushing squeezes against a lamp fixture to provide a frictionally-controlled mounting for the lamp. The elongated fitting body is provided with an external longitudinally-extending flange or the like, to mount the fitting body to a surface such as a wall.

In a preferred embodiment, the inner face of the ring is at a substantially 45 degree angle, relative to the central axis of the ring. Typically the lamp fixture is a lamp pole, a riser, or a standard. The sleeve or bushing is generally composed of a flexible resilient plastic such as nylon, teflon, polyethylene, polypropylene, or polyvinyl chloride, which is usually self-lubricating. Typically the fitting body and the ring are composed of a metal, such as brass, bronze, copper, aluminum, zinc, cast iron, wrought iron, or chrome-plated iron or steel. In most instances, the external mounting means, for mounting the adjustable friction mounting to a wall or the like, is a longitudinally-extending flange portion of the fitting body, together with at least one opening or recess to accommodate a screw or bolt.

The invention accordingly consists in the features of construction, combination of elements, and arrangement of parts which will be exemplified in the device and article of manufacture hereinafter described, and of which the scope of application is as elucidated supra and as will be indicated in the appended claims.

BRIEF DESCRIPTION OF THE DRAWINGS

In the accompanying drawings in which are shown several of the various possible embodiments of the invention:

FIG. 1 is an overall elevation view of one embodiment of the invention, in place on a lamp pole;

FIG. 2 is an exploded sectional elevation view, taken substantially along line 2—2 of FIG. 1;

FIG. 3 is a sectional elevation view of the fully assembled device of FIGS. 1 and 2;

FIG. 4 is a sectional plan view taken substantially along the line 4—4 of FIG. 3;

FIG. 5 is an exploded perspective view of the FIGS. 1-4 embodiment of the invention; and FIG. 6 is an exploded elevation view of an alternative embodiment of the invention.

DETAILED DESCRIPTION OF THE PREFERRED EMBODIMENTS

Referring now to FIG. 1, the present adjustable friction mounting for lamps is generally designated as 10. The friction mounting 10 includes an elongated fitting body 12, a ring 14, and external flange means 16 comprising external means on the elongated fitting body 12, to mount the fitting body 12 to the surface 18 of a wall 20. A lamp pole 22 extends longitudinally through the friction mounting 10 to a lamp 24. Typically the lamp pole 22 is hollow and conducts internal electrical wiring, not shown, to the lamp 24.

Referring now to FIGS. 2, 3, 4 and 5, the elongated fitting body 12 has a through passage 26. The passage 26 is cylindrical, and has an inwardly-extending terminal circular shoulder 28 at its lower end 30. The passage 26 also terminates at its other upper end 32 with an outwardly-extending threaded circular recess 34. As shown, the recess 34 is of greater diameter than the through passage 26.

A flexible resilient cylindrical inner sleeve or bushing 36 is provided within the passage 26. The sleeve or bushing 36 is split longitudinally at 38 and, as shown, the sleeve or bushing 36 is disposed coaxially within the through passage 26 in the fitting body 12. The inner sleeve or bushing 36 is compressible in service, so that its circumferential dimension is decreased whereupon it squeezes against the pole 22 and provides frictional restraint and a friction mounting for the pole 22 and lamp 24.

The externally threaded ring 14 is the third principal element in the present adjustable friction mounting combination. The ring 14 has external threading 40, which mates with the internal threading of circular recess 34. in addition, the ring 14 has a bevelled inner face 42 at its inner end 44. The bevelled inner face 42, as shown, is typically at an angle of about 40 to 50 degrees relative to the axis of the ring, such axis being coincident with the axis of the sleeve or bushing 36 and the passage 26, so that these elements are coaxial. Preferably, the inner bevel face 42 is at an angle of about 45 degrees relative to the axis of the ring.

As best seen in FIG. 3, when the ring 14 is screwed coaxially into the threaded recess 34, the bevel face 42 contacts the upper end 46 of the inner sleeve or bushing 36, and distorts the sleeve or bushing 36 inwards, inter alia since the lower end 48 of the sleeve or bushing 36 contacts and rests on the shoulder 28, see FIG. 3. Thus, the circumferential dimension of the sleeve or bushing 36 is decreased, whereby the sleeve or bushing 36 squeezes against the lamp fixture, in this case the lamp pole 22, to provide a frictionally controlled mounting for the lamp 24.

The external flange means 16 is provided with threaded recesses 50 and 52, so that threaded bolts 54 and 56 may be extended through holes 58 and 60 in wall 20, to be screwed into the respective recess 50 or 52, so as to mount the fitting body 12 to the surface 18 of wall 20, as shown in FIG. 3. Thus, the flange 16 and appurtenances thereto constitutes external means on the elongated fitting body 12 to mount the body 12 to surface 18. In this embodiment of the invention, the external mounting means 16 is a longitudinally-extending flange portion of the fitting body 12, together with the openings or recesses 50, 52 which accommodate screws or bolts 54, 56.

Referring now to FIG. 6, an alternative external mounting means 62 for mounting a fitting body 64 to a surface 66 is shown. In this embodiment, the bolts or screws 68, 70 extend through holes in the flange element 62 and are screwed into the surface 66. Other elements of the assemblage remain as before.

In practice of the invention and in service, in order to adjust the present friction mounting 10, namely to adjust the position of the lamp, the ring 14 is manually rotated, to back the face 42 away from the sleeve or bushing 36, by displacing the ring 14 upwards. This serves to loosen the assemblage, so that the pole 22 may be shifted upwards or downwards and/or rotated, so as to displace the lamp 24. Thereafter, the ring 14 is screwed back into the recess 34, so as to re-tighten the assemblage and hold the pole 22 in place in its new position, so that the lamp 24 is in a new position also, as desired.

It thus will be seen that there is provided an adjustable friction mounting for lamps which achieves the various objects of the invention, and which is well adapted to meet the conditions of practical use.

As various possible embodiments might be made of the above invention, and as various changes might be made in the embodiments above set forth, it is to be understood that all matter herein described or shown in the accompanying drawings is to be interpreted as illustrative and not in a limiting sense. Thus, it will be understood by those skilled in the art that although preferred and alternative embodiments have been shown and described in accordance with the Patent Statutes, the invention is not limited thereto or thereby, since the embodiments of the invention particularly disclosed and described herein above are presented merely as an example of the invention. Other embodiments, forms, and modifications of the invention, coming within the proper scope and spirit of the appended claims, will of course readily suggest themselves to those skilled in the art. Thus, while there has been described what is at present considered to be the preferred embodiments of the invention, it will be obvious to those skilled in the art that various changes and modifications may be made therein, without departing from the invention, and it is, therefore, aimed in the appended claims to cover all such changes and modifications as fall within the true spirit and scope of the invention. Thus, the ring, sleeve or bushing, elongated fitting body and internal through passage are preferably coaxially aligned along a common central longitudinal axis. Other arrangements and dispostions of these several co-acting elements of the combination may be provided in practice.

What is claimed is:

1. An adjustable friction mounting for lamps comprising:
  (a) an elongated fitting body having a through passage, said body being cylindrical and having a flat surfaced inwardly-extending terminal circular shoulder at one end thereof, and perpendicular to the elongated axis of said body, and an outwardly-extending threaded circular recess at the other end thereof, said recess being of greater diameter than said through passage and said terminal circular shoulder having an inside diameter for limiting said through passage;

(b) said elongated fitting body extending in an axial direction of predetermined length which is in excess of the width of said elongated fitting body;

(c) a flexible resilient cylindrical inner sleeve or bushing, said sleeve or bushing being split longitudinally and being disposed coaxially within said through passage in said fitting body, said inner sleeve or bushing being compressible in service, so that its inner circumferential dimension is decreased, and being of a size and configuration to receive there within a selected portion of a lamp fixture, but in its compressed condition said inner sleeve or bushing has an outside diameter substantially larger than said inside diameter of said circular shoulder;

(d) said sleeve or bushing having a first end which rests upon said flat inwardly extending terminal shoulder when disposed within said through passage and a second end disposed proximate said outwardly-extending circular recess when so disposed;

(e) an externally threaded ring, said ring having a predetermined axis and an inner face at one end at an angle in the range of 40 to 50 degrees relative to said predetermined axis, such that when said ring is screwed coaxially into said threaded recess, said inner face contacts said second end of said inner sleeve or bushing and compresses same inwardly so that its inner circumferential dimension is decreased, whereby said sleeve or bushing squeezes against said selected portion of said lamp fixture when said lamp fixture is disposed therewithin for providing a frictionally controlled mounting for said lamp; and (f) external means on said elongated fitting body for mounting said fitting body to a wall or other surface.

2. The adjustable friction mounting of claim 1 in which said inner face is at a substantially 45 degree angle.

3. The adjustable friction mounting of claim 1 in which said external mounting means comprises a longitudinally-extending flange portion of the fitting body together with at least one opening or recess to accommodate a screw or bolt.

4. The adjustable friction mounting for lamps of claim 1 wherein said fitting body and said ring are fabricated from metal.

5. The adjustable friction mounting for lamps of claim 4 wherien said fitting body and said ring are fabricated from brass.

6. The adjustable friction mounting for lamps of claim 4 wherein said fitting body and said ring are fabricated from a metal selected from a group consisting of brass, bronze, copper, aluminum, zinc, cast iron, wrought iron, and chromeplated iron or steel.

7. The adjustable friction mounting for lamps of claim 1 wherein said sleeve or bushing when disposed coaxially within said through passage rests upon said circular shoulder.

8. The adjustable friction mounting for lamps of claim 1 wherein the selected portion of the lamp fixture includes a pole like member and said sleeve or bushing is of a size and configuration to receive therewithin a portion of the pole.

* * * * *